Patented Dec. 4, 1934

1,983,460

UNITED STATES PATENT OFFICE

1,983,460

NONYELLOWING BAKING ENAMEL

Horace H. Hopkins, Springfield, and Francis S. Stewart, Aldan, Pa., assignors to E. I. du Pont de Nemours & Company, Wilmington, Del., a corporation of Delaware No Drawing. Application March 8, 1932, Serial No. 597,630

5 Claims. (Cl. 134—26)

This invention relates to coating compositions, and more particularly to enamels which are highly resistant to yellowing upon baking.

Baking enamels, especially the white and light colored ones, made from oils, varnishes and synthetic resinous ingredients in accordance with the usual practice are subject to the defect that they discolor considerably during baking and are quite color sensitive in that they yellow considerably with overbaking. Furthermore, certain of the non-drying and semi-drying oils which are used in the practice of the present invention were not satisfactory either alone or in varnishes because they did not dry in a reasonable baking time, or because the varnish constituents other than oil would introduce a discoloration or yellowing upon baking. Previously formulated types of enamels made with polyhydric alcohol-polybasic acid resins could be made satisfactorily water resistant only by baking at very high temperatures, but in such baking operation the resulting discoloration is so severe as to prevent the use of the enamel in any except very dark colors such as solid greens, browns or blacks. If a short baking period and/or a low temperature were used to avoid discoloration the enamel would possess very poor water resistance. An improvement on all oleoresinous baking white enamels or their tints, from a standpoint of yellowing during application, was the white pyroxylin lacquer. This type of finish does not require baking, thus eliminating a step necessary to the use of oleoresinous or synthetic enamels. Pyroxylin lacquers, however, are expensive to make, chiefly on account of the costly solvents required to keep them in solution.

We have discovered that polyhydric alcohol-polybasic acid resins modified with certain fatty oils of the semi and non-drying type produce when combined with certain white pigments a baking enamel which obviates disadvantages inherent in the prior compositions and which possess important advantages which make our new compositions valuable for various uses in the arts. We are aware, however, that various oils of the semi and non-drying type have been incorporated into resins of the polyhydric alcohol-polybasic acid type, but insofar as we are aware the discovery that these resins when modified with certain semi- and non-drying oils and combined with suitable white pigments produces a highly water resistant, yet a non-yellowing enamel, of the type disclosed herein has not been heretofore disclosed nor have such compositions being previously made.

This invention has an object the preparation of white or white tinted enamels which are resistant to yellowing upon baking or force drying. A further object is the preparation of white or white tinted enamels which are highly water resistant. A further object is the preparation of enamels which, when baked, possess excellent water resistance, but which yield a film that does not yellow or lose gloss at the bake necessary to use to obtain such water resistance.

These objects are accomplished by the following invention which consists of incorporating fatty oils with low iodine values into polyhydric alcohol-polybasic acid resins, and formulating these resins with suitable white or light pigments into baking enamels as more fully described hereinafter. We have found that those oils of the drying or semi-drying nature which possess hexabromide numbers below 10 and iodine numbers below 150 are satisfactory for the purposes of the present invention, whereas the substitution of oils having higher hexabromide numbers or iodine values produce enamels some of which are subject to a marked increase in the tendency to yellow upon baking. The iodine value of an oil, as well understood by those skilled in the art, is a measure of the unsaturation of the oil and the hexabromide number is an index of the amount of a constituent having a certain arrangement of the double bonds in its unsaturated portion.

The polyhydric alcohol-polybasic acid resins used in the present invention may be made in accordance with the known practice. We prefer, however, to use the alcoholysis method which consists in heating the oil having the low hexabromide number and iodine value mentioned with glycerol (or other polyhydric alcohol) until the two phases merge into a single phase and then heat the mono and/or di-glycerides thus formed with the polybasic acid, phthalic anhydride being preferred, until resinification takes place. The usual catalysts, such as litharge, may be used in the process. A satisfactory heat schedule for the first or alcoholysis stage is about 3 hours at 250° C. The phthalic anhydride and alcoholized oil is then usually heated for about 10 hours at about 250° C. These resins may also be made by the conventional method of fusing the fatty oil acid with the remaining resin ingredients, it being understood that regardless of the method of manufacturing the resin various additional modifying or flexibilizing agents such as natural resins, monohydric and monobasic acids may be added. The term "oil modified polyhydric alcohol-polybasic acid resin" as used herein refers to the resinous reaction product of a polybasic acid, a polyhydric alcohol and an oil or oil acid derived from an oil of the type mentioned irrespective of the method or order of reacting the ingredients.

The following examples are illustrative of the method of carrying out our invention:

Example I

| | |
|---|---|
| Rape seed oil {Iodine value 97–105, Hexabromide No. 2.0} | 70.8 |
| Glycerol | 23.1 |
| Phthalic anhydride | 56.1 |
| | 150.0 |

This resin when used as the vehicle, pigmented with titanium oxide and baked about one hour at 350° F., will discolor very slightly upon baking and possesses excellent water resistance. The film is hard and tough, yet flexible.

Example II

| | |
|---|---|
| Corn oil {Iodine value 120–130, Hexabromide No. 0.0} | 70.8 |
| Glycerol | 23.1 |
| Phthalic anhydride | 56.1 |
| | 150.0 |

This resin when used as a vehicle, pigmented with titanium oxide and baked about one hour at 300° F., will discolor very slightly upon baking. The film is hard, tough and flexible. This film also possesses excellent water resistance.

Example III

| | |
|---|---|
| Cottonseed oil {Iodine value 104–115, Hexabromide No. not known} | 70.8 |
| Glycerol | 23.1 |
| Phthalic anhydride | 56.1 |
| | 150.0 |

This resin when used as a vehicle, pigmented with titanium oxide, as in Example VI below, and baked about 45 minutes at 350° F., will discolor very slightly upon baking. The film will be hard and will possess excellent water resistance.

Example IV

| | |
|---|---|
| Corn oil {Iodine value 120–130, Hexabromide No. 0.0} | 56.0 |
| Glycerol | 27.5 |
| Phthalic anhydride | 66.5 |
| | 150.0 |

This resin when used as a vehicle, pigmented with titanium oxide after the manner given in Example VII below and baked one hour at 250° F. or its equivalent, will discolor very slightly upon baking. In addition this film possesses excellent water resistance.

Example V

| | |
|---|---|
| Soya bean oil {Iodine value 125–140, Hexabromide No. 3–7.8} | 56.0 |
| Glycerol | 27.5 |
| Phthalic anhydride | 66.5 |
| | 150.0 |

This resin, when used as a vehicle of an enamel pigmented with titanium oxide after the manner given in Example VII below, will discolor very slightly upon baking one hour at 250° F. The water resistance is much superior to air dry synthetic resins of the same type.

The following are examples of baking enamels made with the foregoing resins:

Example VI

| | |
|---|---|
| Titanium oxide | 26.7 |
| Resin of Examples I, II, III | 56.7 |
| Thinner: 2/1 mixture of Hi-flash naphtha and mineral spirits | 16.6 |
| | 100.0 |

This enamel as a film and baked at such temperature as required to harden the film will discolor very slightly upon baking and possesses excellent resistance to water soak failures.

Example VII

| | |
|---|---|
| Titanium oxide | 20.0 |
| Resin of Examples IV, V | 52.5 |
| Thinner: 2/1 mixture of Hi-flash naphtha and mineral spirits | 27.5 |
| | 100.0 |

The above enamel will yellow unusually little upon baking at ordinary baking schedules. If 0.1% cobalt drier on the oil is added, this enamel may be force dried at as low a temperature as 140° F. for one or two hours. When drier is used a lower baking schedule may be used. Drier may be entirely eliminated by baking at a slightly higher temperature, say 2 hours at 250° F.

Example VIII

| | |
|---|---|
| Enamel of Examples VI or VII | 99.5 |
| Ultramarine blue in oil | 0.5 |
| | 100.0 |

This enamel represents a class of tinted enamels and such tinting being but slightly over a trace introduces no harmful discoloration upon baking.

Example IX

| | |
|---|---|
| Calcium base titanium pigment | 20.0 |
| Resin of Examples IV, V | 52.5 |
| Thinner: 2/1 mixture of Hi-flash naphtha and mineral spirits | 27.5 |
| | 100.0 |

This enamel as a film discolors very slightly upon baking and/or upon aging and may be baked at 200° F. or 225° F.

Example X

| | |
|---|---|
| Barium base titanium pigment | 20.0 |
| Resin of Examples IV, V | 52.5 |
| Thinner: 2/1 mixture of Hi-flash naphtha and mineral spirits | 27.5 |
| | 100.0 |

This enamel as a film discolors very slightly, as is also true with calcium base titanium pigment and titanium oxide, upon baking, and may be baked at the low temperatures of 200° F. or 225° F. If 0.1% cobalt is present on the oil, the enamel may be force dried at as low a temperature as 140° F. for one, two, or more hours.

It is to be understood that the term "white pigments" as used herein refers to those pigments the color of which is sufficiently light to make it undesirable that the enamel made therewith be subject to yellowing, and they are furthermore selected from the class of these pigments known to those skilled in the art to have a good degree of resistance to yellowing in enamel compositions of the prior art. Pigments especially suited for the purposes of the present invention are those white chemically inert pigments such as titanium oxide. Other pigments that may be used satisfactorily are the extended titanium oxide pigments shown in the examples as calcium base or barium base titanium pigments shown in the examples. Small amounts of other white pigments such as zinc oxide, white lead, zinc sulphide, antimony oxide, tin oxide, zirconium oxide, and beryllium carbonate may be added with the titanium pigment. The enamels with which the present invention is concerned and which are illustrated in the foregoing examples are made according to the method well known to those skilled in the art.

Various other oils having hexabromide numbers and iodine values within the limits of the invention may be used instead of those mentioned in the examples. Various polyhydric alcohols and polybasic acids, in addition to the glycerol and phthalic anhydride, known to those skilled in the art of making resins, may be used for making the resins disclosed herein.

Among the suitable polybasic acids may be mentioned fumaric, adipic, maleic, succinic, etc. Other suitable polyhydric alcohols are ethylene glycol, polyglycerol and pentaerythritol.

The various oils which may be used in the practice of our invention may be substituted one for the other and produce resins which bake hard dry in short periods. Thus, the rapeseed oil of Example I may be replaced entirely or in part by other oils, non-drying or semi-drying, which have the characteristic of possessing low iodine values, below 150, and/or having a hexabromide number less than 10.

To facilitate the drying upon baking of those oils which are extremely slow drying, small amounts of oils, higher in iodine number than 150 and/or with a hexabromide number greater than 10, may be added to improve the drying characteristics although at the same time slightly more yellowing will be introduced upon baking, e. g. 90% rapeseed, 10% perilla. This mixture, as an example, may be substituted for any other mixture or for the single oils of the examples given heretofore. Driers may also be added to facilitate drying upon baking. Both drier, and oil with high hexabromide number may be used to give still better drying.

This invention finds an important use in the manufacture of compositions used as a water resistant, non-heat yellowing protective white coating on refrigerators, kitchen cabinets, hospital furniture, bathroom fixtures, where water resistance and initial whiteness after baking are of prime importance.

The following table shows the effect of oils having low hexabromide numbers and low average iodine values on the yellowing characteristics of baking enamels formulated with resins made with these oils as compared to the yellowing characteristics of the same enamel formulated with resins made with oils having higher hexabromide numbers and iodine values. The average iodine values are found in Van Nostrand's Chemical Annual of 1918 with the exception of the rubberseed oil. The last column in the table cites comparative numerical values to the yellowing tendency of the enamel. While these are not wholly quantitative, they do show qualitatively that the tendency for the enamel to yellow increases as the hexabromide numbers and iodine values increase. Menhaden, linseed and perilla oils having iodine numbers of 156, 186 and 189, respectively, as well as other oils having hexabromide and iodine numbers higher than those given in the table show a marked tendency to yellow.

| Kind of oil | Hexabromide number | Average iodine value | Yellowing order from whitest to most yellow for films baked 2 hours at 300° F. |
|---|---|---|---|
| Rapeseed | 2.0 | 100 | 1 |
| Cottonseed | 0.0 | 110 | 2 |
| Sunflower | 0.0 | 127 | 3 |
| Corn | 0.0 | 121 | 4 |
| Soya | 3-7.8 | 130 | 5 |
| Safflower | 0.0 | 140 | 6 |
| Walnut | 8.8 | 147 | 7 |
| Rubberseed | 0.0 | 138.6 | 8 |

As further indicating the much greater susceptibility to yellowing of enamels made with resins modified with oils of high iodine values and hexabromide numbers it may be noted that a resin made from 70.8 parts linseed oil (iodine value 170 to 185, hexabromide No. 50 to 54), 23.1 parts glycerol and 56.1 parts phthalic anhydride in accordance with the method previously disclosed produced, when used as a vehicle pigmented with titanium oxide after the manner given in Example VII, enamel which discolored very badly upon baking one hour at 300° F. This type of resin made from an oil with an iodine value over 150 and hexabromide number over 10 is representative of the class of oils which includes: Chiaseed having an iodine value of 192.2 and a hexabromide number of 51.2; China wood having an iodine value of 160 to 180; menhaden oil having an iodine value of 140 to 180 and a hexabromide number of 20 to 34; and perilla oil having an iodine value of 193 to 206 and a hexabromide number of 63.0. Enamels made from resins using oils of this classification, when baked, possess good water resistance but this quality is of no advantage for the resin cannot be used in a baking white on account of its discoloration upon baking.

The property of water resistance coupled with high resistance to yellowing obtained in accordance with the present invention by a baking time such as 1 to 2 hours at 300° F. as the case may be is a particular advantage of our invention. The high baking temperature required to harden films making use of the synthetic resin vehicles containing non-drying or semi-drying oils, as disclosed herein, also imparts the quality of excellent water resistance. Although high water resistance is in some instances imparted to the enamels previously known by using oils with high hexabromide numbers, they are subject to such bad discoloration upon baking that the water resistance quality offers no advantage in white enamels made from such vehicles.

The freedom from heat yellowing of our white pigment baking enamels, more particularly titanium oxide enamels or tints thereof, especially during baking introduces a new type of finish. In addition, the described class of enamels possesses a luster similar to porcelain in appearance. These enamels, made as herein described, have a higher gloss than that of the typical proxylin finish. In addition, these enamels maintain their flexibility upon aging to a remarkable degree.

It will be apparent from the foregoing that we have developed white pigmented enamels which can be baked at a temperature sufficiently high to impart water resistance without yellowing or loss of gloss. We wish to emphasize that this combination alone distinguishes our improved enamels from those previously known.

As many apparently widely different embodiments of this invention may be made without departing from the spirit and scope thereof, it is to be understood that we do not limit ourselves to the specific embodiments thereof except as defined in the following claims.

We claim:

1. A process for manufacturing articles provided with a water resistant coating of substantially non-yellowed baked white enamel which comprises applying to the article to be coated a film of a white enamel composition comprising white pigment consisting preponderately of titanium pigment, a solvent, and polyhydric alcohol-polybasic acid resin containing in chemically combined form a substantial quantity of fatty oil acids of which not less than about 90% consists of the fatty oil acids of a fatty oil having an iodine value not greater than 150 and a hexabromide number not greater than 10, baking the film until it is converted into a hard, highly water-resistant film.

2. The process set forth in claim 1 in which said white pigment consists of titanium pigment admixed with a small amount of white pigment other than titanium pigment.

3. The process set forth in claim 1 in which said white pigment is titanium pigment admixed with a small amount of zinc oxide.

4. The process set forth in claim 1 in which the film is baked at a temperature within the range of approximately 250° F. to 350° F. for a time of from about 1 to 2 hours.

5. An article of manufacture which comprises metal covered with a baked coating of a hard white non-yellowed enamel which comprises a baked film of enamel composition comprising white pigment consisting preponderately of titanium pigment, and polyhydric alcohol-polybasic acid resin containing in chemically combined form a substantial quantity of fatty oil acids of which not less than about 90% consists of the fatty oil acids of a fatty oil having an iodine value not greater than 150 and a hexabromide number not greater than 10.

HORACE H. HOPKINS.
FRANCIS S. STEWART.